United States Patent
Henze et al.

(10) Patent No.: US 11,593,262 B1
(45) Date of Patent: Feb. 28, 2023

(54) GARBAGE COLLECTION COMMAND SCHEDULING

(71) Applicant: Seagate Technology LLC, Cupertino, CA (US)

(72) Inventors: Jonathan Henze, Rochester, MN (US); Michael Scott Hicken, Rochester, MN (US)

(73) Assignee: Seagate Technology LLC, Fremont, CA (US)

( * ) Notice: Subject to any disclaimer, the term of this patent is extended or adjusted under 35 U.S.C. 154(b) by 365 days.

(21) Appl. No.: 15/962,993

(22) Filed: Apr. 25, 2018

(51) Int. Cl.
*G06F 12/02* (2006.01)
*G06F 3/06* (2006.01)
*G06F 16/17* (2019.01)

(52) U.S. Cl.
CPC ........ *G06F 12/0269* (2013.01); *G06F 3/0659* (2013.01); *G06F 3/0679* (2013.01); *G06F 16/1727* (2019.01)

(58) Field of Classification Search
CPC ............. G06F 12/0269; G06F 12/0246; G06F 3/0659; G06F 3/0688; G06F 3/0679; G06F 16/1727
See application file for complete search history.

(56) References Cited

U.S. PATENT DOCUMENTS

| | | | |
|---|---|---|---|
| 5,920,876 A | 7/1999 | Ungar et al. | |
| 6,480,862 B1 | 11/2002 | Gall | |
| 6,512,693 B2 * | 1/2003 | Honda | G11C 8/12 365/185.11 |
| 6,751,155 B2 | 6/2004 | Gorobets | |
| 7,114,045 B1 * | 9/2006 | Pliss | G06F 12/0276 711/159 |
| 7,392,269 B2 * | 6/2008 | Chauvel | G06F 12/0804 711/170 |
| 7,463,521 B2 | 12/2008 | Li | |
| 8,266,334 B2 * | 9/2012 | Chu | G06F 1/3203 710/14 |
| 8,321,647 B2 * | 11/2012 | Khmelnitsky | G06F 12/0246 711/154 |
| 8,327,109 B2 * | 12/2012 | Caspole | G06F 12/0253 707/819 |
| 8,447,920 B1 | 5/2013 | Syu | |
| 8,448,018 B2 * | 5/2013 | Jeddeloh | G06F 3/064 714/6.22 |
| 8,452,913 B2 * | 5/2013 | Sudo | G06F 12/0246 711/100 |
| 8,572,311 B1 | 10/2013 | Shalvi et al. | |
| 8,626,986 B2 * | 1/2014 | Wu | G06F 12/0253 711/170 |

(Continued)

*Primary Examiner* — Miranda Le
(74) *Attorney, Agent, or Firm* — Christian W. Best (57) ABSTRACT

Systems and methods are disclosed for the intelligent scheduling of garbage collection operations on a solid state memory. In certain embodiments, a method may comprise initiating a garbage collection process for a solid state memory (SSM) having a multiple die architecture, determining an order of die access for the garbage collection process based on an activity table indicating a use of one or more die in the multiple die architecture, and performing the garbage collection process based on the determined order of die access. Garbage collection reads may be directed to idle die to avoid conflicts with die busy performing other operations, thereby improving system performance.

18 Claims, 6 Drawing Sheets

(56) References Cited

U.S. PATENT DOCUMENTS

| | | | | |
|---|---|---|---|---|
| 8,677,203 B1* | 3/2014 | Shalvi | ............... | G06F 3/0655 |
| | | | | 714/747 |
| 8,769,190 B1 | 7/2014 | Syu et al. | | |
| 8,943,263 B2* | 1/2015 | Frost | ................. | G06F 11/076 |
| | | | | 711/103 |
| 9,218,283 B2* | 12/2015 | Gorobets | ........... | G06F 12/0246 |
| 9,229,854 B1 | 1/2016 | Kuzmin et al. | | |
| 9,354,814 B2* | 5/2016 | Alcantara | ........... | G06F 12/0246 |
| 9,626,312 B2* | 4/2017 | Frid | ........................ | G06F 13/18 |
| 9,753,653 B2* | 9/2017 | Ellis | ........................ | G06F 3/0611 |
| 9,785,556 B2* | 10/2017 | Sundararaman | .... | G06F 12/0831 |
| 9,905,294 B1 | 2/2018 | Canepa et al. | | |
| 2006/0294165 A1* | 12/2006 | Bacon | ................. | G06F 12/0253 |
| 2008/0250089 A1* | 10/2008 | Siegwart | ............ | G06F 12/0253 |
| 2009/0276478 A1 | 11/2009 | Soman et al. | | |
| 2010/0199125 A1* | 8/2010 | Reche | .................. | G06F 11/108 |
| | | | | 714/6.22 |
| 2012/0001668 A1* | 1/2012 | Urzi | ...................... | G06F 9/4843 |
| | | | | 327/142 |
| 2012/0005406 A1* | 1/2012 | Hutchison | ........... | G06F 12/0246 |
| | | | | 711/E12.008 |
| 2013/0219111 A1* | 8/2013 | Bolanowski | ........ | G06F 12/0246 |
| | | | | 711/103 |
| 2014/0185376 A1 | 7/2014 | Sinclair et al. | | |
| 2014/0189205 A1 | 7/2014 | Sinclair et al. | | |
| 2014/0189208 A1 | 7/2014 | Sinclair et al. | | |
| 2015/0248921 A1* | 9/2015 | Chen | ........................ | G11C 5/04 |
| | | | | 711/103 |
| 2015/0370701 A1* | 12/2015 | Higgins | ............... | G06F 12/0253 |
| | | | | 711/103 |
| 2016/0124847 A1* | 5/2016 | Malwankar | ......... | G06F 12/0253 |
| | | | | 711/103 |
| 2016/0162186 A1* | 6/2016 | Kashyap | ............... | G06F 3/0688 |
| | | | | 711/103 |
| 2016/0188410 A1* | 6/2016 | Lee | ..................... | G06F 11/1044 |
| | | | | 714/6.24 |
| 2017/0123666 A1* | 5/2017 | Sinclair | ................. | G06F 3/0604 |
| 2020/0401513 A1* | 12/2020 | He | ....................... | G06F 12/0253 |
| 2020/0401515 A1* | 12/2020 | Liang | ................... | G11C 11/1659 |
| 2021/0182190 A1* | 6/2021 | Gao | .................... | G06F 12/0269 |

* cited by examiner

GARBAGE COLLECTION COMMAND SCHEDULING

SUMMARY

In certain embodiments, a method may comprise initiating a garbage collection process for a solid state memory (SSM) having a multiple die architecture, determining an order of die access for the garbage collection process based on an activity table indicating a use of one or more die in the multiple die architecture, and performing the garbage collection process based on the determined order of die access.

In certain embodiments, a memory device may store instructions that, when executed, cause a processor to perform a method comprising initiating a garbage collection process for a solid state memory (SSM) having a multiple die architecture, determining an order of die access for the garbage collection process based on an activity table indicating a use of one or more die in the multiple die architecture, and performing the garbage collection process based on the determined order of die access.

In certain embodiments, an apparatus may comprise a solid state memory (SSM) having a multiple die architecture, each die including a plurality of storage blocks, and a storage controller. The storage controller may be configured to initiate a garbage collection process to recover storage space of the SSM, including reading data from a garbage collection unit (GCU), storing valid data read from the GCU to a new location, and erasing data from the GCU, the GCU including a storage block from each of a plurality of die of the multiple die architecture. The storage controller may determine an order of die access for the garbage collection process based on an activity table indicating a busy state of die in the plurality of die, and perform the garbage collection process based on the determined order of die access.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
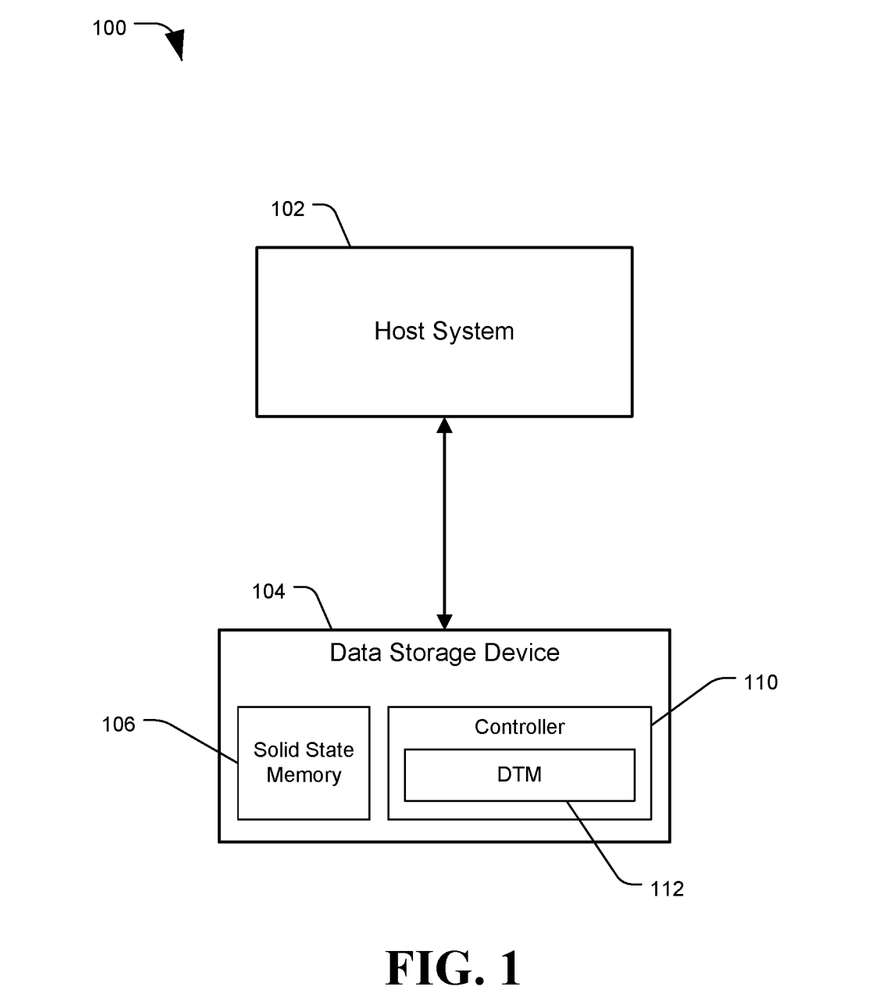
FIG. 1 is a diagram of a system configured to perform garbage collection command scheduling, in accordance with certain embodiments of the present disclosure.

FIG. 1 is a diagram of a system, generally designated 100, configured to perform garbage collection command scheduling, in accordance with certain embodiments of the present disclosure. The system 100 may include a data storage device (DSD) 104, such as a storage drive or any other device which may be used to store or retrieve data, including a solid state drive (SSD), or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives. The DSD 104 may include a memory 106 and a controller 110. The memory 106 may comprise one or more non-volatile memory (NVM) data storage mediums, such as solid state memory (sometimes referred to herein as SSM or NVSSM) including NAND flash memory, other types of memory, or a combination thereof. The controller 110 may be one or more processors or circuits configured to perform data access operations, such as reads or writes (also called program operations), to the memory 106. Data retrieved from the memory 106, or to be stored to the memory 106, may be processed via the controller 110, a read/write (R/W) channel, or other elements for encoding or decoding data, error correction, or other processing.

The system 100 may include a host device 102, which may also be referred to as the host system or host computer. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the memory 106 via the controller 110 based on the requests.

As will be discussed in greater detail in regard to FIG. 2, some SSMs 106, such as NAND flash memory, may have a multiple die architecture made up of multiple flash die configured for storing data, and each die may contain one or more planes. Each plane may include multiple blocks for data storage, and each block may include multiple data storage units called pages. A die may be the smallest unit that can independently execute commands, although concurrent, generally identical operations can take place on each plane. For example, a single die having two planes may be able to execute two concurrent write operations, one on each plane. However, a die may not be able to concurrently execute a read and a write, nor two writes to blocks on a single plane.

New data may be written in increments of pages (or in some embodiments, sub-pages). However, data may only be erased in increments of blocks. Data may also not be overwritten in place, and instead an entire block must be erased before already written pages can be written to again. Therefore, when data is updated in NAND memory, rather than overwriting the old data with the new data, the new data may be stored in a new location, and the old data may be left on the memory and marked as invalid. As used herein, invalid data is data that a drive no longer needs to retain, either because it has been replaced by a newer version of the same data, or because a host or other system has indicated that the data can be wiped. Valid data may refer to data that has not been rendered invalid by being replaced by a newer version of the data, or by a trim command or other operation indicating that the data is no longer needed and can be marked for erasure. The status of pages as valid or invalid may be tracked by the controller 110 and stored to a mapping table or other data structure, rather than being stored to the individual NAND memory pages themselves.

Some storage systems may be configured to store data to the dies of a NAND memory in a striped manner. As discussed below for FIG. 2, data may be written across dies, so that a first page of a first block of each die is written before a second page of the first block of any die is written. In this manner, data may be "striped" across page 1 of block 1 of each die. In some of these systems, data may be written to dies in a preset order, such as starting with die 0 and proceeding through increasing-numbered dies until a last die N is written, and then returning to die 0. This may be considered a standard or normal write sequence or order.

Over time, the memory 106 may fill up with a combination of valid and invalid data. In order to recover usable space, some DSDs 104 including some SSMs 106 will periodically perform garbage collection operations to free up storage space. During garbage collection, the DSD 104 may read the data from one or more blocks and write the valid data to a new location. Then the block can be erased, thereby freeing up space that was occupied by invalid data in the block.

When a solid state drive 104 is subject to a continuous random write workload for an extended period of time, eventually the write performance of the drive may be determined by how quickly it can garbage collect blocks to free up space for the new incoming data. Since a die may only be able to execute one command at a time, sometimes the garbage collection reads can get stalled from other activity on the flash die, mainly programs (e.g. writes) and erases to other blocks. When the reads are scheduled to access the dies in the same order as the writes (e.g. the standard write order described above), there may be a high likelihood that if one read encounters a die that is busy with a program, then the next read will also encounter a die that is busy with a program. Hitting busy dies one after another can create a noticeable stall in the garbage collection process and can negatively impact the overall garbage collection performance. This can directly affect the user write performance as well, as the write performance cannot exceed the rate that garbage collection is reclaiming free space from invalid data when the device storage is at or near capacity. As NAND program times increase with newer generations these stalls may continue to get worse.

Accordingly, system performance can be improved by reducing or eliminating garbage collect reads being delayed by other operations on a die. This improvement can be implemented by the inclusion of a die tracking module (DTM) 112 in the DSD 104. The DTM 112 may be included within the storage controller 110, located between the controller 110 and the SSM 106, or situated elsewhere within the DSD 104.

The DTM 112 may be configured to monitor the busy status of dies of the SSM 106, such as by monitoring commands being issued to the dies and command statuses returned from the SSM 106 to the controller 110. The DTM 112 may maintain an activity table or other data structure indicating the use of one or more dies in the SSM 106. For example, the DTM 112 may maintain a bitmap, with a bit for each die indicating whether it is "busy" (e.g. with a program or erase cycle), or "available". Alternatives are also possible, such as using multiple bits per die, with different bit configurations indicating what sort of operation the die is busy performing (e.g. 00 indicates available, while 01 indicates busy with a program cycle, 10 indicates busy with an erase cycle, and 11 indicates busy with a read). When a garbage collection operation is to be performed, the activity table may be consulted to determine which die are busy, so that garbage collection reads can be directed to available die. This can result in the garbage collection reads being performed in a different order than reads are generally executed, and can be used to avoid die conflicts and delayed garbage collection, thereby improving device performance. An example embodiment of system 100, including a more detailed diagram of DSD 104, is depicted in FIG. 2.

Figure 2:
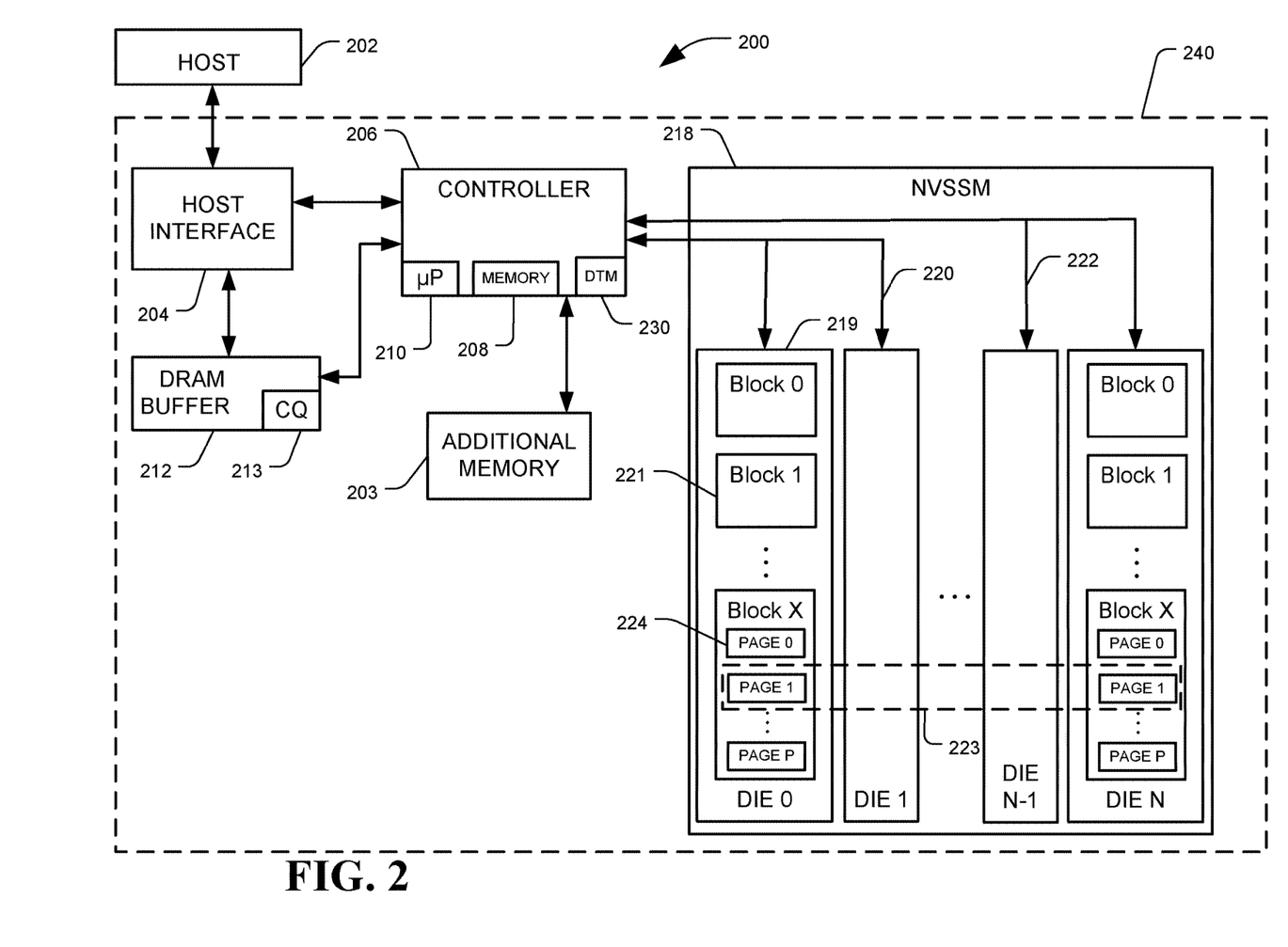
FIG. 2 is a diagram of a system configured to perform garbage collection command scheduling, in accordance with certain embodiments of the present disclosure.

FIG. 2 is a diagram of a system, generally designated 200, configured to perform garbage collection command scheduling, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as solid state drive (SSD) 200, according to some embodiments. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can be DRAM, SRAM, or other types of memory. The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller 206 may control data access operations, such as reads and writes, to one or more nonvolatile solid state memories (NVSSM) 218, such as NAND flash memory. The DSD 200 may include one or more additional memories 203 instead of or in addition to NVSSM 218. For example, additional memory 203 can be either volatile memory such as DRAM or SRAM, disc-based nonvolatile memories such as magnetic hard discs, other types of memory, or a combination thereof. The additional memory 203 can function as a working memory for storing generated parity data, a cache to store recently or frequently read or written data, or data likely to be read soon, or for other temporary data storage. Additional memory 203 may also function as main long-term storage instead of or in addition to NVSSM 218. A DSD 200 containing multiple types of nonvolatile storage mediums, such as a disc(s) and flash, may be referred to as a hybrid storage device.

The controller 206 may send and receive commands, data, and status information to and from the NVSSM 218 via one or more channels, such as channels 220 and 222. Channels 220 and 222 may each include one or more data busses used for executing data access operations to a set of dies of the NVSSM 218. The channels 220 and 222 may optionally also include other components used in data access operations to the NVSSM 218. For example, channels 220 and 222 may include components to encode data during write operations and decode user data retrieved from the NVSSM 218 during read operations, detectors to determine bit values, other components, or any combination thereof. In some architectures, the controller 206 may have sub-controllers for each channel 220, 222, which manage low-level details of operations to the multiple dies on its associated channel. The sub-controllers may optionally include encoders, decoders, or other elements for data access operations to dies on the respective channel 220 or 222.

The NVSSM 218 may include NAND flash memory, according to some embodiments. A NAND flash memory device may include a plurality of physical dies 219 (e.g. die 0 to die N) for storing data. Each die 219 may include one or more planes as described above, although for simplicity the figures depict an example employing single-plane dies 219. Each die (and each plane) may include a plurality of blocks 221 (e.g. block 0 to block X), which may be the smallest unit that can be erased in a NAND flash memory. A block 221 may store, e.g., 4-8 MB of data. Each block 221 may include a plurality of pages 224 (e.g. page 0 to page P), which may be the smallest unit of storage that can be programmed, or written to. An example page may store 8 or 16 KB of data. Write data received from the host 202 may therefore be written the NVSSM 218 one page 224 at a time. An example NAND die 219 may comprise multiple (for example, approximately 1000) NAND blocks 221, and within each NAND block 221 there may be multiple NAND pages (for example, approximately 512).

In some embodiments, data may be stored to the NVSSM 218 using a data striping approach. Rather than writing to one block 221 at a time, starting at page 0 and writing until the last page P is full before moving on to a next block, data may be written to a data stripe 223 that is striped across pages 224 of blocks 221 of multiple dies 219. An example data stripe may include one page 224 from a corresponding selected block 221 from each die 219. In the depicted embodiment, the data stripe 223 includes page 1 from block X of each die. In this manner, writing to a NVSSM 218 may begin by striping across page 0 of block 0 of each die, followed by a second stripe 223 across page 1 of block 0 of each die, through page P of block 0 of each die, and then moving on to page 0 of block 1 of each die, etc. In some architectures, there may be multiple sets of dies, so that striping is performed across all dies in a set, rather than all dies in the entire NVSSM 218. In some architectures the stripe 223 can include different block numbers from each die. So for example a stripe 223 may include block X from die 0 along with block Y from die 1, and block Z from die 2, etc. For the sake of simplicity in description, however, the presumption in the descriptions provided herein may be that a corresponding block from each die is used in a stripe 223.

Using the striped data writing approach, writing may start at die 0, then die 1, and continue on through die N. In some embodiments, writing may be performed partially or wholly in parallel. For example, before a write to die 0 has completed, the system may begin a write to die 1, and possibly dies 2 and 3 as well. However, as program operations may take significantly longer than reads, garbage collection reads may still repeatedly experience collisions with ongoing program operations even when the program operations are performed partially in parallel.

Data stored to NAND flash may not be overwritten or edited, so as updated data comes in, older versions are left written to a previous page 224 and marked as invalid, while the updated data is written to a new page 224. When the storage space begins to fill up, the DSD 200 may perform garbage collection operations, which may include selecting an old block 221 having pages with invalid data, copying the valid data to pages 224 of a new block 221, and erasing the entire old block 221. Garbage collection may be performed by determining valid data within a selected block, reading and storing the valid data, and then erasing the block. Alternately, garbage collection may be performed by reading all data from a block, then determining which of the read data is valid, and only writing the valid data to a new location, while erasing the old block.

Multiple blocks may be logically grouped together for the purposes of garbage collection into a garbage collection unit (GCU). When garbage collection is to be performed, the SSD 200 may select a GCU for garbage collection, and then garbage collect all the blocks in that GCU. In some embodiments, a corresponding block from each die (e.g. Block 0 from each die) may comprise a GCU, so that there may be a same number of GCUs in the NVSSM 218 as there are blocks 221 on a die 219. Grouping the blocks 221 in this manner may be helpful in systems employing striped writing, so that the striped data is generally kept together by garbage collecting matching blocks together.

Using the same block numbers from every die 219 when building the GCU may be a simple approach, but there may be situations where the controller 206 may use different numbered blocks from different die instead. In an example use case, the controller 206 may replace a bad block 221 in one GCU with a spare good block that had not been allocated to a GCU. There may also be architectures that use different block numbers from different die to minimize the impact from NAND issues (e.g. block X may have a higher error rate due to its physical location in the die 219 and that may be true for all dies). Using different blocks from different die may reduce the risk of multiple blocks within the same GCU failing.

As stated above, when using the striped data writing approach writing may start at die 0, then die 1, and continue on through die N. Therefore die 0 may be the logically "earliest" or "first" die, and die N may be the logically "latest" or "last" die. Consequently, as streaming writes are received at the DSD 200, die 0 may be busy with a write first, then die 1, etc. A garbage collection operation may be initiated to garbage collect the GCU for blocks 0, starting at the earliest die. Writes and erases may take more time than reads, and so the garbage collection reads may "catch up" to a die at which streaming writes are being performed to a different block (e.g. Block 2 of die 1). If the garbage collection reads wait for the write to finish at die 1, then the write flow may have proceeded to die 2 (or for a write stream performed substantially in parallel, the write to die 2 may not yet be completed after the write to die 1 completes). The garbage collection may quickly read one or more pages from block 0 of die 1, and then once again have to wait on the write to complete at die 2. This may continue across the entire NVSSM 218, significantly slowing the garbage collection operation. Therefore it may be advantageous to perform garbage collection reads in a different order than how writes and erases may be performed. Further, the garbage collection reads may be intelligently scheduled to avoid conflicts with busy dies, with reads being performed at whichever dies are available, rather than in a fixed order.

In order to determine where to schedule garbage collection reads, the DSD 200 may include a die tracking module (DTM) 230. The DTM 230 may be integrated into or executed by the storage controller 206, between the storage controller 206 and the NVSSM 218, or otherwise executed by or located within the DSD 200. The DTM 230 may keep track of which dies are busy, which information can be used for determining where to direct garbage collection reads.

When the controller 206 sends a command (e.g. a program, erase, or read) to the NVSSM 218, the controller 206 may designate a target or selected die 219 to service the command. The DTM 230 may receive a copy of the command and target die designation (e.g. by being situated along the command path), and may use the commands to update an activity table or other data structure which indicates the busy status of die. For example, the activity table may be in the form of a bitmap stored to a memory, such as memory 208 or to an internal memory of the DTM 230. The bitmap may include a bit for each die, with the bit value indicating whether or not the die is busy. In an example embodiment, a '0' value may indicate that the die is busy or unavailable to perform garbage collection reads, while a '1' value may indicate that the die is available to perform garbage collection reads. When a die 219 sends a command completed response to the controller 206, the DTM 230 may again update the activity table to reflect that the selected die is no longer busy. For example, the controller 206 may know how long different types of commands take to execute. Once the appropriate amount of time has passed since sending a corresponding command, the controller 206 may send a status query to the NVSSM 218, to which the NVSSM 218 may respond with a "complete" status, "busy" status, or some other status. When a response is sent indicating that a selected die is no longer occupied performing a command, the DTM 230 can update the activity table.

When the controller 206 determines that a garbage collection operation should be performed, it may access the activity table maintained by the DTM 230 to determine where to direct the garbage collection reads. In some embodiments, the controller 206 (potentially via the DTM 230) may generate a table, bitmap, or other data structure indicating which dies need to be read for a given stripe of a garbage collection operation. For example, a bitmap may be generated and stored to memory 208 for one or more stripes of a GCU, which may include a bit value for each die of the GCU. For example the GCU could include block 0 of each die 219, and the stripe may be for page 0 from each block 0. A bit value of '1' in the stripe bitmap may indicate the corresponding die has yet to be read for the current stripe, while a bit value of '0' may indicate that the data from the corresponding die has already been read and buffered (e.g. to memory 208 or DRAM buffer 212) for that stripe. The controller 206 or DTM 230 may compare the die activity bitmap and the garbage collection read bitmap (e.g. via a logical "AND" operation) to determine which die still need to be read for the current stripe and are also not busy performing other operations. A target die from the available die could then be selected for a garbage collection read. Other die selection criteria could also be used to select a die when multiple die need to be read and are available. For example, additional criteria could include selecting a logically earliest die (e.g. in the striped writing order) for reading first, or selecting a die that has one or more logically subsequent dies that are also available.

Once all the die for the current stripe have been read, a bitmap for the next stripe may be generated (e.g. for page 1 of each block 0) and the process repeated. In some embodiments, the controller 206 may be configured to maintain bitmaps for multiple stripes concurrently (e.g. stripes for page 0, page 1, page 2, and page 3 of the block 0 from each die). If no blocks still need to be read from available die of stripe 0, a determination may be made as to whether any die are available to receive reads for stripe 1.

Once the data has been read and buffered from the GCU selected for garbage collection, the valid data may be stored to an available block or stripe of the NVSSM 218, and the blocks of the garbage collected GCU can be erased. Additional example embodiments of die activity bitmaps and stripe bitmaps are shown and described in regards to FIGS. 3A through 3C.

Figure 3A:
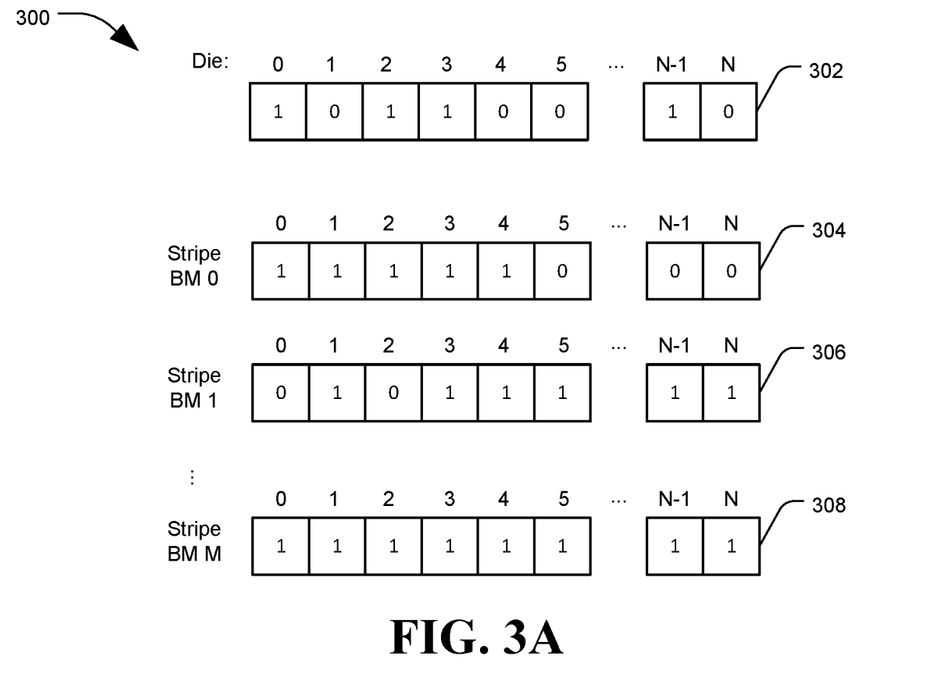
FIGS. 3A, 3B, and 3C are diagrams of bitmaps employed for garbage collection command scheduling, in accordance with certain embodiments of the present disclosure.
Figure 3B:
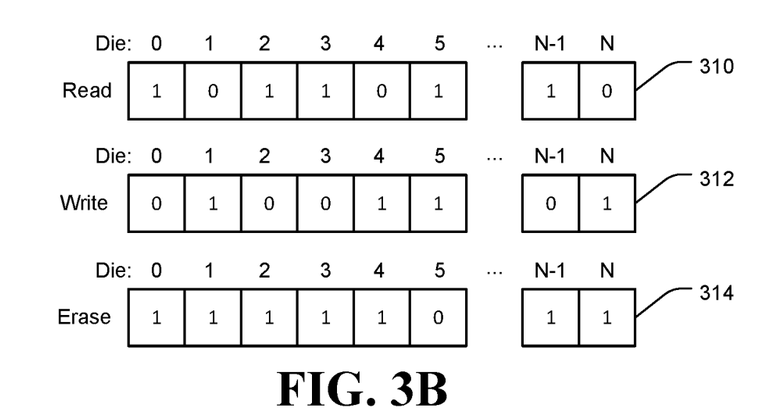
Figure 3C:
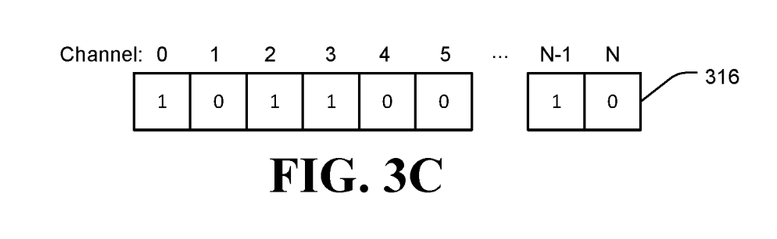

FIGS. 3A, 3B, and 3C are diagrams of example bitmaps employed for garbage collection command scheduling, in accordance with certain embodiments of the present disclosure.

FIG. 3A depicts an example die activity bitmap (BM) 302 which may be maintained by a die tracking module (DTM) as discussed herein. The die activity BM 302 may include a bit for each die of a non-volatile solid state memory (NVSSM), such as die 0 through die N. A bit may be set to '1' when the selected die is available to perform garbage collection writes, and '0' when the die is unavailable. FIG. 3A may also depict a set of stripe bitmaps, such as stripe BM 0 304, stripe BM 1 306, through stripe BM M 308. The stripe BMs may also include a bit value for each die. In the example stripe bitmaps, a '1' may indicate that the corresponding die still needs to be read for that stripe, while a '0' may indicate that corresponding die has already been read or does not need to be read (e.g. it contains no valid data).

A DSD may compare the stripe BMs against the die activity BM to determine where to schedule garbage collection reads. For example, the values for dies from the die activity BM 302 may be logically ANDed with the corresponding die in a stripe BM to determine which dies still need to be read and are available to be read for the selected stripe. For example, a DSD may perform a logical AND with the die activity BM 302 and the stripe BM 0 304 to determine where to perform a next garbage collection read for stripe 0. By performing a logical AND, a result will be generated that has the same number of bits as the die BM and stripe BM, and so has one bit for each die. A '1' and a '1' will produce a '1', while any other combination may produce a '0'. Any result bit with a '1' value indicates that the corresponding die both needs to be read for the current stripe and is available to perform a garbage collection read. In the depicted example of FIG. 3A, a logical AND may produce a result indicating that dies 0, 2, and 3 all still need to be read and are available to receive garbage collection reads.

The DSD may maintain stripe BMs for multiple stripes. For example, maintaining a stripe BM for stripe 0 304 and stripe 1 304 may allow the DSD to send garbage collection reads for stripe BM 1 306 to dies that are available, but that do not need to be read for stripe BM 0 304. A logical AND of stripe BM 1 306 and die activity BM 302 may indicate that dies 3 and N−1 are available and still need to be read for stripe 1. If dies 0, 2, and 3 are available and need to be read for stripe BM 0 304, the DSD may send stripe 0 reads to dies 0 and 2, and stripe 1 reads to dies 3 and N−1. Or if the DSD intendeds to send stripe 0 reads to dies 2 and 3, then a stripe 1 read may be performed on die N−1.

In some examples, multiple die may be available to read and still need to be read from a stripe, and the DSD may select the die(s) to read based on different priority criteria. For example, the DSD may prioritize reads to a die that is idle when the next die (from a logical striping perspective) is also idle. This may allow both die to be read in sequence, potentially keeping logically associated data together. For example, data written in a striped manner may span across the corresponding page of multiple die. Reading the data back in order may therefore keep data organized better when the valid data is re-written in a new location. A greater number of logically sequentially available die may be given priority over fewer logically sequential available die (e.g. four consecutive idle dies may be selected over a set of two consecutive idle dies). A single idle die may be selected if there are no sequential idle dies. If no die are idle that still need to be read for the current stripe, then the read may be queued to perform at a busy die once it becomes available. If two or more dies have equal priority based on the above criteria, then the logically "earliest" die (e.g. in a stripe-writing order, starting at die 0 and writing sequentially to die N) may be selected.

FIG. 3B depicts an example embodiment in which multiple die activity BMs are tracked, including a different BM for different kinds of operations being performed by the die. In the example embodiment of FIG. 3B, the DSD may track a die read activity BM 310, a die write activity BM 312, and a die erase activity BM 314. It may be advantageous to track different types of operations, as different operations may require different amounts of time to perform. For example, a read may require a first, shortest amount of time, a write may require a second, slower amount of time, and an erase may require a third, slowest amount of time. If no die are idle, it may be advantageous to schedule a read to a die that is most likely to complete its current operation first (e.g., the die is performing the fastest operation, such as a read). A stripe BM may be compared (e.g. via a logical AND operation) against all three die activity BMs to determine if any die is free, and if not, a read may be queued to a busy die, with priority given to dies busy with a read, then to dies busy with a write, and then finally to dies busy with an erase.

Multiple types of commands may be tracked in other ways than maintaining a die activity BM for each type of command. For example, two bits may be stored for each die, thereby providing a four-value range per die. As an example, a value of '0' (bits 00) may indicate the die is idle, while a value of '1' (01) may indicate the die is busy with a read, a value of '2' (10) may indicate the die is busy with a write, and a value of '3' (11) may indicate the die is busy with an erase. In some embodiments, a two-bit value may then be stored for each die of the stripe BMs (e.g. with a 00 indicating the die needs to be read, while 11 indicates the die does not need to be read), so that the die activity BM and the stripe BMs could still be compared using a logical AND operation. In other embodiments, the system could walk through each die that still needs to be read using a stripe BM, and for each die needing to be read the die activity BM could be consulted. The die with the current lowest value in the die activity BM could be stored as the next die to read, or the read could proceed immediately if a die showing 00 is encountered. In this manner, dies busy with reads (01) would be prioritized over programs (10), which would be prioritized over erases (11), and the first die with the lowest value would be the die selected for a read. Other embodiments are also possible.

Variations on die tracking activity tables may also be employed. In one example, the DSD may logically group sets of dies, and track the busy status of die sets instead of tracking the status of individual dies. For example, the DSD may group dies into sets of two (e.g. die 0 and die 1 comprising set 1, die 2 and die 3 comprising set 2, etc.). If any of the dies in a set are busy, the entire set may be indicated as busy in a bitmap or other activity table. If none of the dies in the set are busy, the set of idle dies may all be read simultaneously or in sequence for a selected stripe. This approach may reduce granularity, but may also result in data being read in more sequential order, corresponding to an order in which the data was written, than if individual dies were read in non-sequential order. An example use case for grouping die may include the die grouping described in U.S. Pat. No. 9,905,294 to Canepa, et al.

In another example of variations on die tracking, FIG. 3C depicts an example channel activity BM 316. As discussed in regard to FIG. 2, there may be multiple channels (e.g. channels 220, 222) between the storage controller 206 and the NVSSM 218. There may be a plurality of dies 219 on each channel. Commands and data can be exchanged between the controller 206 and the dies 219 via the channel, which may result in a channel being "busy" if, for example, read data is being transferred from one of the dies on the channel to the controller 206. A garbage collection read command may need to wait to be sent to an idle die if the channel on which the idle die is connected is busy transferring data from another die on the same channel.

Accordingly, the DTM or another component of the DSD may track a busy status of channels instead of or in addition to tracking the busy status of dies. Similar to grouping sets of dies as discussed above, the channel activity BM 316 may use a bit value to indicate whether any of the dies on a selected channel are busy. The channel activity BM 316 may indicate whether the dies are busy with any sort of activity, or may be limited to indicating whether the dies are busy with an activity which may occupy the channel for a longer period, such as commands resulting in significant amount of data being transferred over the channel. A channel activity BM 316 may be used in conjunction with a die activity BM 302. For example, the die activity BM 302 may be used to determine which die are idle and have not yet been read for a stripe. The DSD may then compare that determined set of dies against the channel activity BM 316, and prioritize reads to dies that are both idle and that also do not share a channel with a busy die. An example flowchart of a method for garbage collection command scheduling is shown in FIG. 4.

Figure 4:
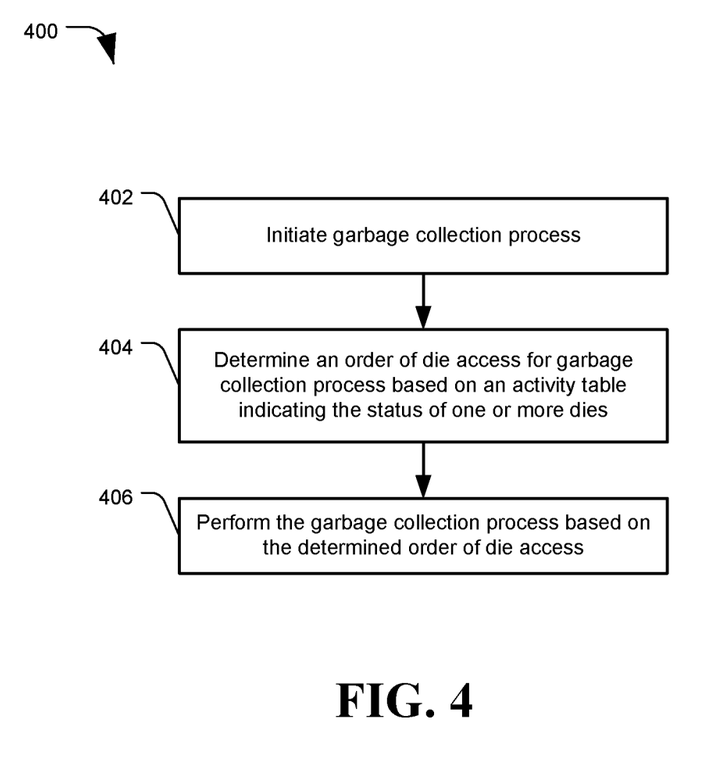
FIG. 4 is a flowchart of an example method of garbage collection command scheduling, in accordance with certain embodiments of the present disclosure.

FIG. 4 is a flowchart of an example method 400 of garbage collection command scheduling, in accordance with certain embodiments of the present disclosure. The method 400 may be performed by a data storage device (DSD) having a multiple die solid state memory architecture, for example via a storage controller, die tracking module (DTM), other components, or any combination thereof.

The method 400 may include initiating a garbage collection process, at 402. For example, a DSD may initiate a garbage collection process when an amount of free storage space falls below a threshold, when the device is idle, or in response to some other triggering event.

The method 400 may include determining an order of die access for the garbage collection process based on an activity table indicating the status of one or more dies, at 404. For example, a DTM may maintain one or more bitmaps indicating whether dies of the memory are idle and available to service garbage collection reads, or whether they are busy performing other operations. For example, a single bitmap may be maintained indicating whether all die are busy or idle, or multiple tables or bitmaps may be maintained indicating which die are busy with different types of operations, how long the dies are expected to be busy, whether other dies on a same channel or bus are busy, other information, or any combination thereof. The activity table may be more complex than a bitmap, for example being in a format that lists a variety of information for one or more dies, such as the described expected busy time, type of operation the dies are busy with, etc. A single table or bitmap may be maintained that covers all the dies of the memory, or dies may be logically divided into sets, with one or more tables or bitmaps devoted to each set.

The method may include consulting the activity table to determine an order of die access for the garbage collection. For example, the table can be used to determine which die are idle, and then one of the die may be selected to receive the next garbage collection read. In some embodiments the method may include generating one or more bitmaps tracking which dies have yet to be read for a selected page stripe of the garbage collection unit (GCU) being garbage collected, and then logically comparing the page stripe bitmap with a die activity bitmap to identify idle die that may be valid targets for garbage collection reads. The ordering of reads may be based on additional information or criteria beyond which dies are idle, such as whether there are sets of logically consecutive idle dies in a page striping order, how many consecutive idle dies, and how early the idle dies are situated in the logical page-striping order (e.g. die 0 may be logically earlier than die 8 in a system that performs page striping starting from die 0 and proceeding to successively higher die numbers). The method may include determining only a next read location, or a sequence of read locations. For example, if multiple logically consecutive dies are idle, the method may include scheduling multiple reads to those dies, either in parallel or in sequence.

Once the order of die accesses has been determined, at 404, the method 400 may include performing the garbage collection process based on the determined order of die access, at 406. The method may be repeated as needed for additional reads, additional page stripes, additional GCUs, or based on other increments, until all the data selected for garbage collection has been read. The data may be read from the selected GCU(s) in the determined order, the valid data may be written to a new location, and the blocks of the GCU(s) may be erased, thereby freeing up space in the memory. A more detailed embodiment of a method of garbage collection command scheduling is described in regard to FIG. 5.

Figure 5:
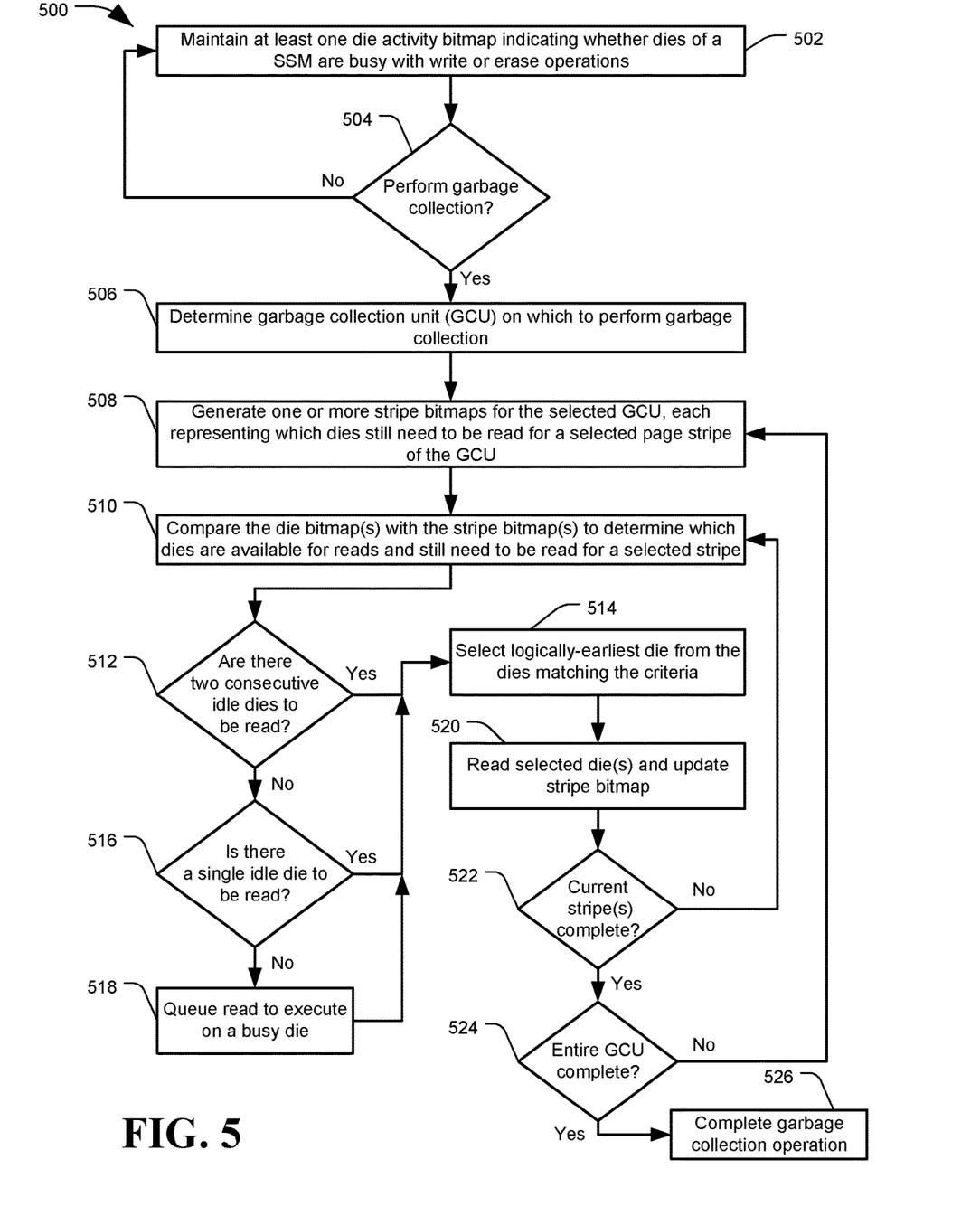
FIG. 5 is a flowchart of an example method of garbage collection command scheduling, in accordance with certain embodiments of the present disclosure.

FIG. 5 is a flowchart of an example method 500 of garbage collection command scheduling, in accordance with certain embodiments of the present disclosure. The method 500 may be performed by a data storage device (DSD) having a multiple die solid state memory architecture, for example via a storage controller, die tracking module (DTM), other components, or any combination thereof.

The method 500 may include maintaining at least one die activity or die status bitmap indicating whether dies of a solid state memory (SSM) are busy, for example with erase or write operations, at 502. In some embodiments, the bitmaps may track whether a die is busy with any activity including reads, or different bitmaps may be employed to track which dies are busy with which type of operations. While bitmaps are one approach to tracking die activity, other types of activity tables may also be used, which may optionally include multiple types of information or metadata about the status of dies in the memory. The die activity bitmaps may be updated as commands are sent to the SSM and as the SSM returns command completion information.

At 504, the method 500 may include determining whether to perform a garbage collection operation at the SSM, for example based on a remaining free storage capacity threshold or based on an idle status of a storage drive including the SSM. If a determination is made not to perform garbage collection, the method 500 may include continuing to maintain and update the die activity bitmaps, at 502.

When a determination is made to perform garbage collection, the method 500 may include determining one or more garbage collection units (GCUs) on which to perform garbage collection. For example, a GCU may be selected based on an amount of invalid data in the GCU, based on how "hot" or "cold" (e.g. how frequently updated or accessed) the data is, a wear level of blocks in the GCU, based on other factors, or any combination thereof. A GCU may include data storage blocks from multiple die of the SSM. For example, a GCU may comprise a corresponding block from each die, such as block 0 from each die comprising GCU 0, although other storage configurations and logical arrangements are also possible.

The method 500 may include generating one or more stripe bitmaps for the selected GCU, with each bitmap representing which dies have yet to be read for a selected page strip of the GCU, at 508. The die activity bitmap(s) may be compared with the stripe bitmap(s) to determine which dies are available for reads and still need to be read for a selected stripe, at 510. For example, the method 500 may include performing a logical AND comparison of a stripe bitmap and a die activity bitmap to determine valid target dies for garbage collection reads for the selected stripe.

Next, the method 500 may include prioritizing which die to direct the next garbage collection read to. The method 500 may include determining whether there are two or more logically consecutive idle dies that have yet to be read for the selected stripe, at 512. If there are multiple sets of logically consecutive idle dies to be read, priority may be given to the sets with the most dies. If there is at least one set of logically consecutive idle dies to be read, the method 500 may include selecting a logically-earliest die from the dies matching the criteria, at 514. For example, if dies 2, 3, and 4 are available, as well as dies 7, 8, and 9, the method 500 may include selecting die 2 for the next read, or in some embodiments, scheduling concurrent reads to dies 2, 3, and 4. It should be noted that, in some architectures, concurrent reads are possible but the controller may have some resource constraints (e.g. limited buffer availability, command tracking structures, channel availability, etc) that would limit how many concurrent reads the controller can perform, and to which dies. Given the resource constraints there may also be a balance between allocating resources for internal operations like garbage collection versus allocating resources towards host operations. Accordingly, the method 500 may include waiting for a selected amount of resources to become available, and then allocating those resources to perform one or more garbage collection reads.

If there are not two or more consecutive idle dies, at 512, the method 500 may include determining whether there are any single idle dies that have yet to be read, at 516. If so, the method 500 may include selecting the logically-earliest die from the available single dies, at 514.

If there are no individual idle dies available, at 516, the method 500 may include queuing a garbage collection read to execute on a busy die, at 518. In some embodiments, the die activity bitmaps or tables may indicate what types of operations the dies are performing, with some operations known to complete faster than other operations (e.g. reads may be faster than writes). In these systems, priority may be given to scheduling reads to dies that are busy with an operation likely to finish the fastest. Once the busy die options are determined, at 518, the method 500 may include selecting the logically-earliest die from the dies matching the criteria, at 514. For example, if all dies are busy, and it is determined that dies 4, 9, and 10 are busy with reads that are expected to finish the soonest, a garbage collection read may be queued for die 4.

Once a target die(s) is selected for the garbage collection read, the method 500 may include reading the selected die(s) and updating the stripe bitmap to reflect that the die(s) no longer need to be read, at 520. In architectures that support it, several pages may be read from a die once it has been selected (e.g. potentially retrieving data from multiple stripes for the selected die). For example, this may be used in some architectures NAND flash memory, in which multiple pages of information may be stored to a single wordline (e.g. in multi-level cell (MLC) flash memory).

A determination may then be made whether all dies have been read for the current stripe, at 522. If no, the method 500 may continue by comparing the die activity bitmap(s) to the stripe bitmap to determine a next read location, at 510. If the stripe has been completed, the method 500 may include determining whether the entire GCU has been read, at 524. If not, the method may return to generating one or more stripe bitmaps for remaining stripes of the GCU, at 508. For example, if a system generates some number of stripe bitmaps less than all of the stripes of the GCU, when a stripe or set of stripes is completed, the system may generate additional bitmaps for remaining unread stripes of the GCU. When the entire GCU has been read, the method 500 may include completing the garbage collection operation, at 526. This may include erasing the GCU and writing the valid data to a new location, or back to the same newly erased GCU. In some embodiments, valid data read from the GCU may be written to a new location shortly after the read completes, rather than waiting for the entire GCU to be read, for example due to resource limitations such as buffer space. Accordingly, garbage collection writes may be occurring in parallel with continuing garbage collection reads.

When discussing the data to be read for a stripe or GCU, in some embodiments all data of the GCU may be scheduled to be read, whether valid or invalid. In other embodiments, only valid data may be scheduled to be read. In the latter case, when a stripe bitmap is generated it may initially have dies that do not need to be read, because those dies contain only invalid data for the current stripe. There may be advantages to either approach depending on system design and implementation. An example method of garbage collection command scheduling when different length operations are tracked for dies is described in regard to FIG. 6.

Figure 6:
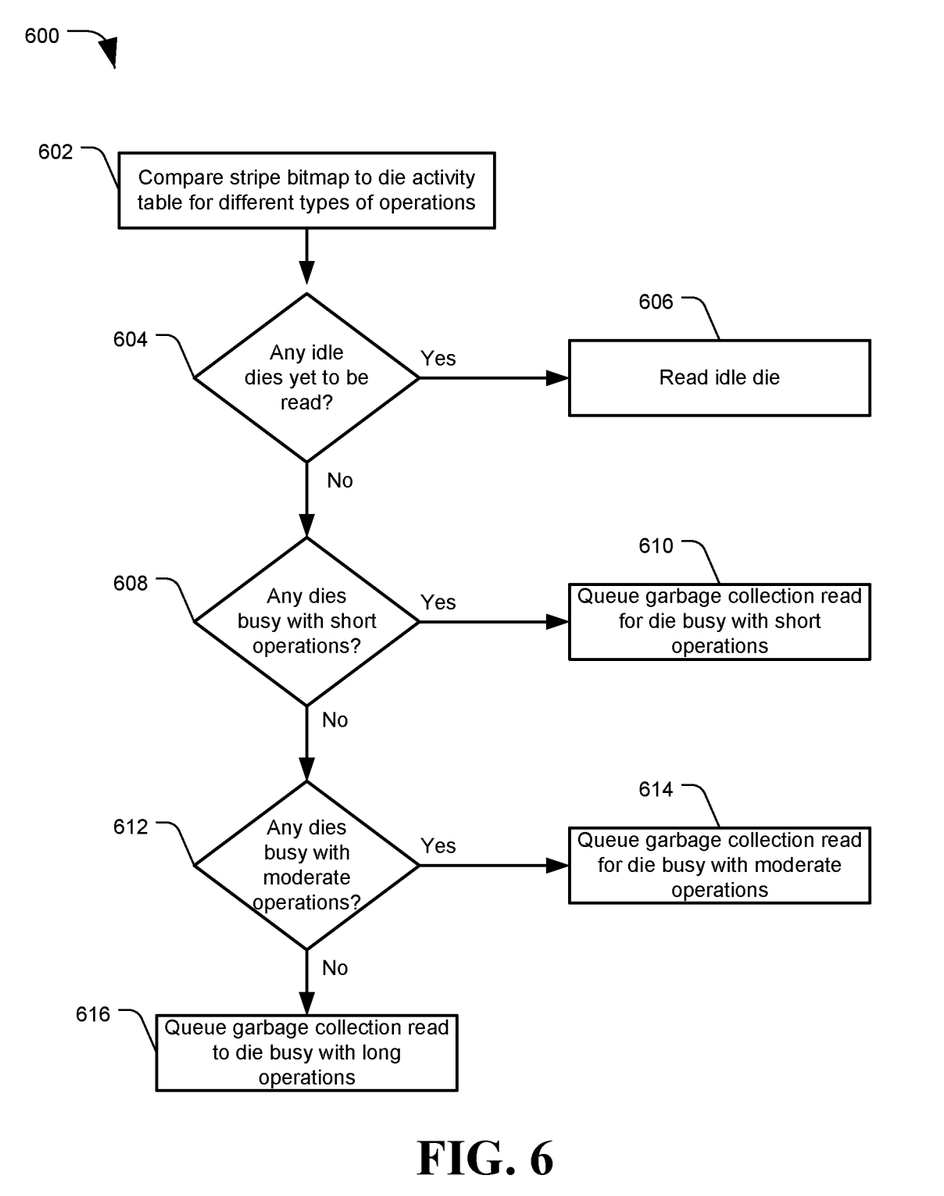
FIG. 6 is a flowchart of an example method of garbage collection command scheduling, in accordance with certain embodiments of the present disclosure.

FIG. 6 is a flowchart of an example method 600 of garbage collection command scheduling, in accordance with certain embodiments of the present disclosure. The method 600 may be performed by a data storage device (DSD) having a multiple die solid state memory architecture, for example via a storage controller, die tracking module (DTM), other components, or any combination thereof.

As described above, a system may track multiple types of pending operations for the dies of a SSM. For example, die status may be tracked using a different die activity bitmap for each type of command or the expected busy duration of the die, or an activity table may have entries for each time identifying the type of operation the die is performing or the expected delay in completing the command. In some embodiments, a plurality of bitmaps or tables may be referred to herein as a single die activity table or die status table. The tracked different command types or durations may be used to prioritize where to direct garbage collection reads in the event that all dies are currently busy.

At 602, the method 600 may include comparing a stripe bitmap to a die activity table identifying different types or durations of operations that the dies are busy performing. A determination may be made whether any dies are idle and yet to be read for the current stripe, at 604. If yes, the method 600 may include reading an idle die, at 606.

If no dies are idle and yet to be read, a determination may be made whether any dies are busy with short operations, at 608. For example, different types of operations may have known or estimated durations, with some operations taking more time than others. Read operations may be short, while writes may be moderate and erases may be long. These are examples, and there may be more or fewer operations that are tracked. A die busy status may also be grouped into categories of "long", "moderate", and "short" based on an anticipated delay or busy status, regardless of the specific operation. Dies may each be given a numerical delay estimate, rather than a broad grouping, with the system prioritizing reads to the shortest delay value. These are example implementations only, and other approaches providing actual or estimated busy status length are also possible. If any dies are busy with short operations, the method 600 may include queueing a garbage collection read for one of the dies busy with a short operation, at 610.

If no dies that have yet to be read are busy with short operations, a determination may be made whether any dies yet to be read are busy with moderate operations (e.g. a write), at 612. If so, the method 600 may include queueing a garbage collection read to a die busy with a moderate operation, at 614. If no dies yet to be read are busy with moderate operations, the method 600 may include queueing a garbage collection read to a die busy with a long operation, at 616.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   initiating a garbage collection process for a solid state memory (SSM) having a multiple die architecture, the garbage collection process to recover storage space from a garbage collection unit (GCU) including blocks from a plurality of dies;
   determining an order in which to access the plurality of dies to perform the garbage collection process, including:
   maintaining an activity table as a first data structure indicating which of one or more dies in the multiple die architecture are unavailable to service read operations of the garbage collection process;
   accessing the activity table to determine a busy status of the one or more dies in the multiple die architecture, the busy status indicating whether the one or more dies are busy performing access operations and therefore unavailable to perform the garbage collection process;
   maintaining a second data structure indicating which of the one or more dies have data that has yet to be read for the garbage collection process;
   setting the order to access the plurality of dies based on the busy status of the one or more dies, including comparing the first data structure and the second data structure to determine the order of die access for garbage collecting non-busy dies before busy dies; and
   accessing the plurality of dies in the determined order to execute the garbage collection process.

2. The method of claim 1 further comprising:
   determining whether two or more dies that are consecutive in a data striping order are available for garbage collection read operations based on the first data structure and the second data structure; and
   prioritizing garbage collection reads to the determined two or more dies over garbage collection reads to non-consecutive available dies.

3. The method of claim 1 further comprising:
   prioritizing garbage collection reads to earlier dies in a data striping order when multiple dies are available and yet to be read for the garbage collection process.

4. The method of claim 1 further comprising:
   maintaining a plurality of data structures, including the second data structure, indicating which of the one or more dies have data that has yet to be read, the plurality of data structures each tracking dies to be read for different data stripes of a garbage collection unit.

5. The method of claim 1 further comprising:
   maintain the activity table as a bitmap, with bit values indicating whether each die in the multiple die architecture is busy.

6. The method of claim 1 further comprising:
   the activity table includes a plurality of data structures, including:
   a first data structure indicating whether each die in the multiple die architecture is busy performing a first operation having a first expected delay for completion of the first operation;
   a second data structure indicating whether each die is busy perform ing a second operation having a second expected delay that is longer than the first expected delay; and
   determining the order of die access for the garbage collection process based on the first data structure and the second data structure, including prioritizing garbage collection reads to dies busy performing the first operation over dies busy performing the second operation.

7. The method of claim 1 further comprising:
   logically grouping sets of dies; and
   determining an order to perform garbage collection reads to dies in the sets of dies based on whether any die in a selected set of dies is busy.

8. A memory device storing instructions that, when executed, cause a processor to perform a method comprising:
   initiating a garbage collection process for a solid state memory (SSM) having a multiple die architecture, the garbage collection process to recover storage space from a garbage collection unit (GCU) including blocks from a plurality of dies;
   determining an order in which to access the plurality of dies to perform the garbage collection process, including:
   accessing an activity table to determine an availability status of one or more dies in the multiple die architecture, the availability status indicating whether the one or more dies are busy performing access operations and therefore unavailable to perform the garbage collection process;
   setting the order to access the plurality of dies based on the availability status of the one or more dies, to garbage collect non-busy dies before busy dies, including
   determining whether two or more dies that are consecutive in a data striping order are available for garbage collection read operations based on the activity table; and
   prioritizing garbage collection reads to the determined two or more dies over garbage collection reads to non-consecutive available dies; and
   accessing the plurality of dies in the determined order to execute the garbage collection process.

9. The memory device of claim 8, the method further comprising:
   maintaining the activity table as a first bitmap indicating which of the one or more dies are unavailable to service read operations of the garbage collection process;
   maintaining a second bitmap indicating which of the one or more dies have data that has yet to be read for the garbage collection process; and
   comparing the first bitmap and the second bitmap using a logical AND operation to determine the order of die access.

10. The memory device of claim 9, the method further comprising:
    when there are not two or more consecutive dies available for garbage collection, determine whether there are any non-consecutive dies available for garbage collection;
    performing garbage collection reads to the determined non-consecutive dies; and
    when there are no non-consecutive dies available for garbage collection, queue garbage collection reads on busy dies.

11. The memory device of claim 10, the method further comprising:
prioritizing garbage collection reads to earlier dies in the data striping order when multiple dies are available and yet to be read for the garbage collection process.

12. The memory device of claim 11, the method further comprising:
maintaining a plurality of bitmaps, including the second bitmap, indicating which of the one or more dies have data that has yet to be read, the plurality of bitmaps each tracking dies to be read for different data stripes of a garbage collection unit that includes a block of data storage from each die of the multiple die architecture.

13. The memory device of claim 12, the method further comprising:
the activity table includes the plurality of bitmaps, including:
the first bitmap indicating whether each die in the multiple die architecture is busy performing a write operation;
a third bitmap indicating whether each die is busy performing an erase operation; and
determining the order of die access for the garbage collection process based on the first bitmap and the third bitmap, including prioritizing garbage collection reads to dies busy performing write operations over dies busy performing erase operations.

14. An apparatus comprising:
a storage controller configured to communicate with a solid state memory (SSM) having a multiple die architecture, each die including a plurality of storage blocks, the storage controller also configured to:
initiate a garbage collection process to recover storage space of the SSM, including:
reading data from a garbage collection unit (GCU) that includes a storage block from each of a plurality of dies of the multiple die architecture,
storing valid data read from the GCU to a new location, erasing data from the GCU;
determine an order in which to access individual dies within the plurality of dies to reduce completion time of the garbage collection process, including:
maintain an activity table as a first data structure indicating an availability state of the plurality of dies, the availability state indicating which dies are unavailable to service read operations of the garbage collection process;
access the activity table to determine the availability state of each die in the plurality of dies,
maintain a second data structure indicating which of the plurality of dies have data that has yet to be read for the garbage collection process;
set the order to access the plurality of dies based on the busy status of the one or more dies, including comparing the first data structure and the second data structure to determine the order of die access for garbage collecting non-busy dies before busy dies; and
access each individual die in the determined order to perform the garbage collection process.

15. The apparatus of claim 14 comprising the storage controller further configured to:
determine whether two or more dies that are consecutive in a data striping order are available for garbage collection read operations based on the first data structure and the second data structure; and
prioritize garbage collection reads to the determined two or more dies over garbage collection reads to non-consecutive available dies.

16. The apparatus of claim 14 comprising the storage controller further configured to:
maintain a plurality of data structures, including the second data structure, indicating which of the one or more dies have data that has yet to be read, the plurality of data structures each tracking dies to be read for different data stripes of the garbage collection unit.

17. The apparatus of claim 14 further comprising the SSM.

18. The apparatus of claim 14 comprising the storage controller further configured to:
logically group sets of dies, such that the GCU includes blocks from multiple sets of dies; and
determine an order to perform garbage collection reads to the sets of dies based on whether any die in a selected set of dies is busy, including performing garbage collection reads to a different set of dies when any die in the selected set of dies is busy.

* * * * *